US010869190B2

(12) United States Patent
Mondello et al.

(10) Patent No.: US 10,869,190 B2
(45) Date of Patent: Dec. 15, 2020

(54) SECURE VEHICULAR SERVICES COMMUNICATION

(71) Applicant: Micron Technology, Inc., Boise, ID (US)

(72) Inventors: Antonino Mondello, Messina (IT); Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 216 days.

(21) Appl. No.: 16/034,809

(22) Filed: Jul. 13, 2018

(65) Prior Publication Data
US 2020/0021981 A1 Jan. 16, 2020

(51) Int. Cl.
*H04W 12/04* (2009.01)
*H04L 9/14* (2006.01)
*H04W 4/40* (2018.01)

(52) U.S. Cl.
CPC ............... *H04W 12/04* (2013.01); *H04L 9/14* (2013.01); *H04W 4/40* (2018.02); *H04L 2209/80* (2013.01)

(58) Field of Classification Search
CPC .... G06K 9/00; H04L 9/32; H04L 9/08; H04L 9/14; H04W 12/04; H04W 4/40; H04W 4/80
See application file for complete search history.

(56) References Cited

U.S. PATENT DOCUMENTS

| | | | |
|---|---|---|---|
| 6,307,936 B1 * | 10/2001 | Ober | G06F 8/60 |
| | | | 380/277 |
| 7,557,731 B2 | 7/2009 | Ramasubbu | |
| 9,253,251 B2 * | 2/2016 | Jackson | G08G 1/0175 |
| 2012/0098657 A1 | 4/2012 | Bogatine | |
| 2013/0293394 A1 | 11/2013 | Rubin et al. | |
| 2014/0073254 A1 | 3/2014 | Ichihara et al. | |
| 2015/0134428 A1 | 5/2015 | Li et al. | |
| 2016/0132705 A1 | 5/2016 | Kovarik et al. | |

(Continued)

OTHER PUBLICATIONS

DICE: Device identifier Composition Engine—Microsoft Research—by Paul England, Dennis Mattoon, Rob Spiger, Stefan Thom, Andrey Marochko, Marcus Peinado, and Kevin Kane; Established: Jan. 1, 2015, pp. 8 (Year: 2015).*

(Continued)

*Primary Examiner* — Thanhnga B Truong
(74) *Attorney, Agent, or Firm* — Brooks, Cameron & Huebsch, PLLC

(57) ABSTRACT

Secure vehicular services communication is described herein. An example apparatus can include a processor and an external communication component. The external communication component can be coupled to the processor and can be configured to, in response to determining a vehicular entity is within a particular proximity to the external communication component, generate an external private key and an external public key, provide the external public key and data to a vehicular communication component associated with the vehicular entity, receive data from the vehicular communication component in response to providing the external public key and data to the vehicular communication component, decrypt the received data using the external private key, and provide a service to the vehicular entity based on the decrypted received data.

22 Claims, 7 Drawing Sheets

(56) References Cited

U.S. PATENT DOCUMENTS

2018/0006810 A1   1/2018  Ideguchi et al.
2018/0033301 A1   2/2018  Riou et al.
2019/0335304 A1*  10/2019 Yabuuchi ................ H04W 4/44

OTHER PUBLICATIONS

Happich, "RFID Sensor Tags to Monitor Road Conditions", Feb. 16, 2015, (1 pg.), eeNews Europe, dated Feb. 16, 2015, retrieved from http://www.eenewseurope.com/news/rfid-sensor-tags-monitor-road-conditions.

U.S. Appl. No. 15/993,119, entitled, "Transmission of Vehicle Route Information by Passive Devices," filed May 30, 2018, (25 pgs.).

International Search Report and Written Opinion from related International application No. PCT/US2019/040448, dated Oct. 25, 2019, 14 pages.

* cited by examiner

SECURE VEHICULAR SERVICES COMMUNICATION

TECHNICAL FIELD

The present disclosure relates generally to apparatuses and methods related to vehicles, and more particularly, to secure vehicular services communication.

BACKGROUND

Motor vehicles, such as autonomous and/or non-autonomous vehicles, (e.g., automobiles, cars, trucks, buses, etc.) can use sensors and/or cameras to obtain information about their surroundings to operate safely. For example, autonomous vehicles can control their speed and/or direction and can recognize and/or avoid obstacles and/or hazards based on information obtained from sensors and/or cameras. For example, vehicles may use light detection and ranging (LIDAR), vehicle-to-everything (V2X), RADAR, and/or SONAR detection techniques, among others, to obtain information about their surroundings. As used herein, an autonomous vehicle can be a vehicle in which at least a portion of the decision-making and/or control over vehicle operations is controlled by computer hardware and/or software/firmware, as opposed to a human operator. For example, an autonomous vehicle can be a driverless vehicle.

DETAILED DESCRIPTION

Secure vehicular services communication is described herein. An example apparatus can include a processor and an external communication component. The external communication component can be coupled to the processor and can be configured to, in response to determining a vehicular entity is within a particular proximity to the external communication component, generate an external private key and an external public key, provide the external public key and data to a vehicular communication component associated with the vehicular entity, receive data from the vehicular communication component in response to providing the external public key and data to the vehicular communication component, decrypt the received data using the external private key, and provide a service to the vehicular entity based on the decrypted received data.

In some previous approaches, vehicles have used cameras and sensors to obtain information about their surroundings. However, the operation of these cameras and sensors can depend on weather conditions and can be hampered by inclement weather conditions. External communication components can provide redundancy and/or additional transportation information that can improve vehicle operation, resulting in technological improvements to the vehicle. For example, information provided by the external communication components that can be positioned on a transportation assistance entity can be used if vehicular cameras and/or sensors fail, such as due to weather-related events.

In some previous approaches, vehicles have used sensors, such as vehicle to infrastructure (V2I) sensors, to obtain route information from external communication components along a route, such as overhead radio frequency identification (RFID) readers, cameras, traffic lights, lane markers, streetlights, signage, parking meters, or the like. However, in these previous approaches, the communication between a vehicle and an external communication component can be both public and unsecured. In addition, the communication may not be able to be verified, introducing possible nefarious activity that can negatively affect the performance of the vehicle.

As will be described herein, by introducing a secure form of communication for obtaining vehicular services and an ability to accurately identify who is requesting and/or receiving vehicular services, information related to nefarious activity in relation to these vehicular services can be rejected, avoided, discarded, etc. Public keys can be exchanged and used to encrypt data while private keys, which remain private and exclusive to a single entity, can be used to decrypt data. In this way, those without the private key are prevented from intercepting service data and using it for purposes other than initially intended. Further, certificates and signatures can be used to verify identities of a sender of data and insure that data originates from an intended source.

Figure 1:
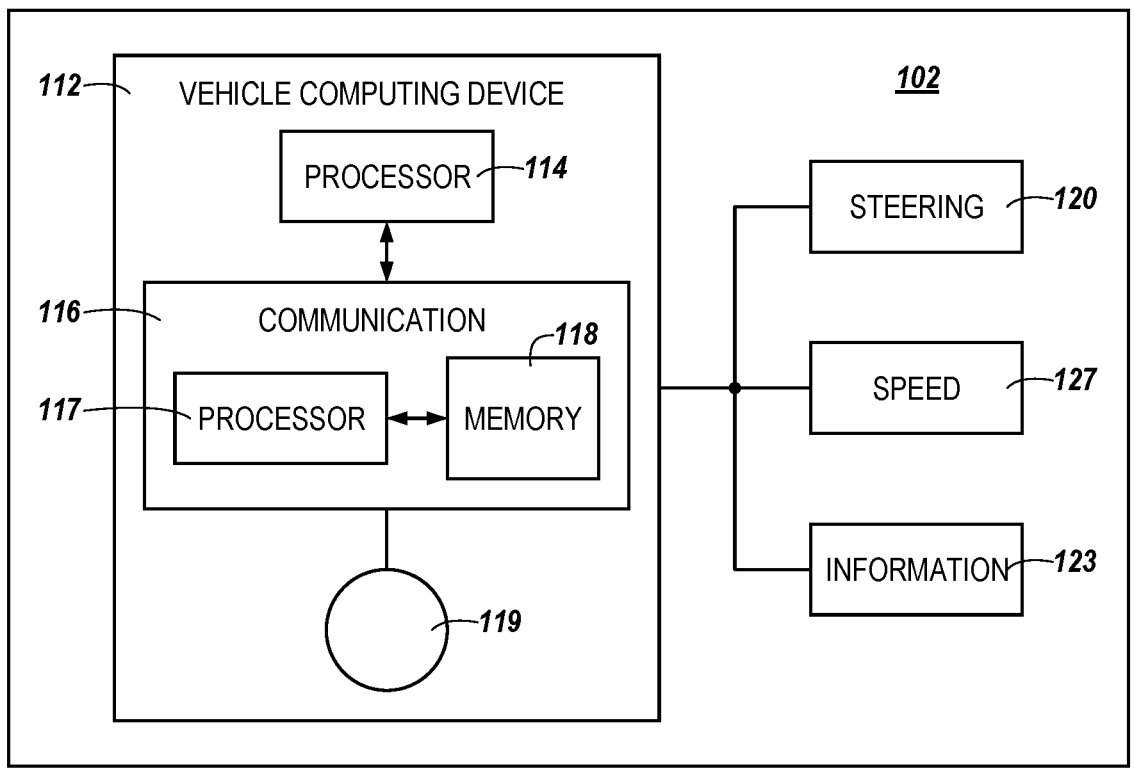
FIG. 1 is a block diagram of an example vehicular entity, in accordance with an embodiment of the present disclosure.

FIG. 1 is a block diagram of an example vehicular entity 102 in accordance with an embodiment of the present disclosure. The vehicular entity 102 can be an autonomous vehicle, a traditional non-autonomous vehicle, an emergency vehicle, a service vehicle, or the like, and that can be referred to as an apparatus. The vehicular entity 102 can include a vehicle computing device 112, such as an on-board computer. Vehicle computing device 112 can include a processor 114 coupled to a vehicular communication component 116, such as a reader, writer, and/or other computing device capable of performing the functions described below, that is coupled to (e.g., or includes) an antenna 119. Vehicular communication component 116 can include a processor 117 coupled to a memory 118, such as a non-volatile flash memory, although embodiments are not so limited.

Vehicle computing device 112 can control operational parameters of vehicular entity 102, such as steering and speed. For example, a controller (not shown) can be coupled to a steering control system 120 and a speed control system 122. Further, vehicle computing device 112 can be coupled to an information system 123. Information system 123 can be configured to display a message, such as the route information, and can display visual warnings and/or output audible warnings.

Figure 2:
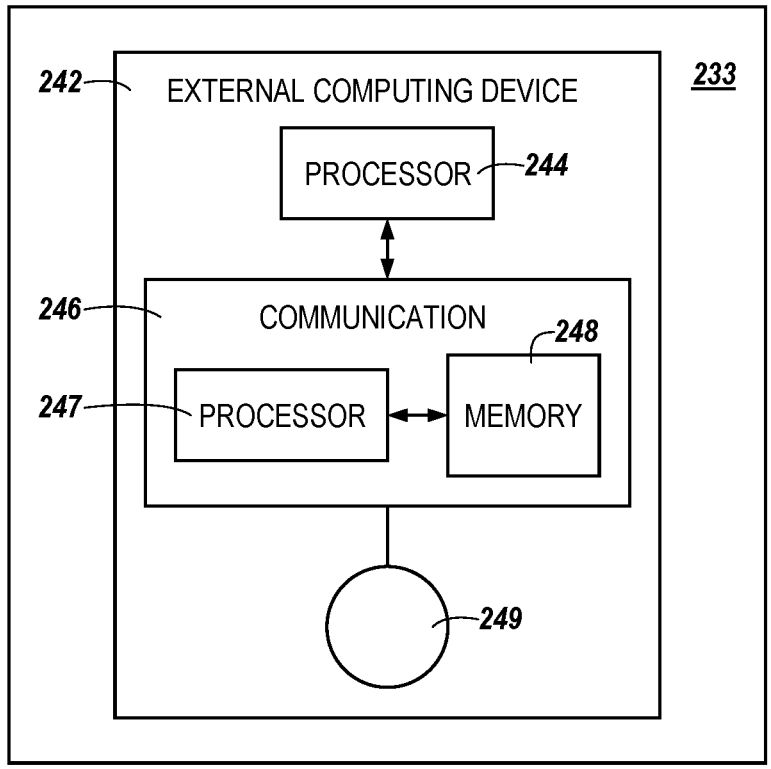
FIG. 2 is a block diagram of an example transportation assistance entity, such as a road or lane including an external communication component, in accordance with an embodiment of the present disclosure.

Communication component 116 can receive route information from additional computing devices, such as from external computing device 233 described in association with FIG. 2. Processor 114 can cause steering control system 120 to adjust the direction of vehicular entity 102 and/or speed control system 122 to adjust the speed of vehicular entity 102 in response (e.g., according) to the route information from communication component 246 in FIG. 2. For example, the route information can indicate the presence of a lane boundary, the presence of a pedestrian, the speed limit, the direction of the road (e.g., the road is straight or curves left or right), that there is a lane change, a detour, or the like. Processor 114 can cause information system 123 to display the route information from communication component 116, such as a distance to a construction zone, a lane change, a crossroad, railroad crossing, or a detour, the presence of a pedestrian, the presence of another vehicle, or the like.

FIG. 2 is a block diagram of an example transportation assistance entity 233, such as a road or lane including an external communication component, in accordance with an embodiment of the present disclosure. The transportation assistance entity 233 can be a road, a road lane, a traffic sign, a street light, an emergency vehicle, a pedestrian, a traffic office, a police officer, etc. The transportation assistance entity 233 can be any element, object, or person capable of having an external communication component positioned, attached, or embedded within or on and able to assist the vehicular entity 102 of FIG. 1.

The transportation assistance entity 233 can include an external computing device 242, such as an on-board computer. External computing device 242 can include a processor 244 coupled to an external communication component 246, such as a reader, writer, and/or other computing device capable of performing the functions described below, that is coupled to (e.g., or includes) an antenna 249. Vehicular communication component 246 can include a processor 247 coupled to a memory 248, such as a non-volatile flash memory, although embodiments are not so limited. The antenna 249 of the external computing device 242 can be in communication with the antenna 119 of the vehicular entity 102.

In some examples, antennas 249 and 119 can be loop antennas configured as inductor coils, such as solenoids. Antenna 119 can loop around vehicular entity 102, for example. Antenna 119 can generate an electromagnetic field in response to current flowing through antenna 119. For example, the strength of the electromagnetic field can depend on the number of coils and the amount of current. The electromagnetic field generated by antenna 119 can induce current flow in an antenna 249 that powers the respective external computing device 242. As an example, antenna 119 in FIG. 1 can induce current flow in antenna 249 when vehicular entity 102 brings antenna 119 to within a communication distance (e.g., a communication range) of the antenna 249. For example, the communication distance can depend on the strength of the electromagnetic field generated by antenna 119. The electromagnetic field generated by antenna 119 can be set, by the number of coils of antenna 119 and/or the current passing through antenna 119, such that the communication distance can span the left and right lanes of a road. In some examples, the communication distance can be about 50 centimeters to about 100 centimeters on either side of vehicular entity 102.

In some examples, the external computing device 242 can include a number of wireless communication devices, such as transmitters, transponders, transceivers, or the like. As an example, the external communication component 246 can be such a wireless communication device. In some examples, wireless communication devices can be passive wireless communication devices that are powered (e.g., energized) by vehicular entity 102, as described above. Wireless communication devices can be located along a route, such as a road, on which vehicular entity 102 can travel. In some examples, the route can include a number of roads. For example, wireless communication devices can be embedded in the roads, embedded and/or located on the walls of a tunnel along the route, located on signs, such as traffic signs, along the route, located in and/or on traffic-control lights along the route, located in and/or on other vehicles along the route, on (e.g., carried by and/or worn by) pedestrians along the route, or the like.

Wireless communication devices can transmit route information about the route to vehicular entity 102 in response to being powered by vehicular entity 102 and/or collect information from vehicular entity 102 in response to being powered by vehicular entity 102. In some examples, route information can include information that can affect the operation of vehicular entity 102 along the route, such as information that can affect the direction and/or the speed of vehicular entity 102 along the route. For example, vehicular entity 102 can make adjustments to its operation and/or indicate that adjustments should be made to its operation in response to the route information.

Wireless communication devices can be short-range wireless communication devices, such as near field communication (NFC) tags, RFID tags, or the like. In at least one embodiment, wireless communication devices can include non-volatile storage components that can be respectively integrated into chips, such as microchips. Each of the respective chips can be coupled to a respective antenna 249. The respective storage components can store respective route information.

In some examples, wireless communication devices can be reprogrammable and can be wirelessly reprogrammed in situ. For example, wireless communication devices can be reprogrammed with updated route information to reflect changes to the road, such as due to road construction, flooding, bridge repairs, detours, lane closures, or the like. For examples in which wireless communication devices are NFC tags, a wireless device with NFC capabilities and application software that allows the device to reprogram the NFC tags can be used to reprogram the NFC tags.

The respective wireless communication devices can respectively transmit their respective route information to communication component 116 in response to vehicular entity 102 passing within the communication distance of the respective wireless communication devices. For example, the respective wireless communication devices can respectively transmit their respective route information in response to being powered by communication component 116. The information can be transferred from wireless communication devices to communication component 116 in the form of signals, such as radio frequency signals. For example, communication devices and communication component 116 can communicate using radio frequency signals.

For examples in which wireless communication devices are NFC tags, communication component 116 can be an NFC reader and can communicate with wireless communication devices using an NFC protocol that can be stored in memory 118 for processing by processor 117. For example, communication component 116 and wireless communication devices can communicate at about 13.56 mega-Hertz according to the ISO/IEC 18000-3 international standard for passive RFID for air interface communications. For example, the information can be transmitted in the form of a signal having a frequency of about 13.56 mega-Hertz.

In some examples, the communication distance may be set such that wireless communication devices are only activated when vehicular entity 102 is too close to wireless communication devices. For example, wireless communication devices can transmit information to communication component 116, indicating that vehicular entity 102 is too close, such as within six inches, one foot, etc. For example, wireless communication devices can be embedded in a road along a centerline and/or an edge of a road and/or located in another vehicle, and the transmitted information can indicate that vehicular entity 102 is too close to the centerline, the edge of the road, or the other vehicle. Communication component 116 can then transmit the information to processor 114. Processor 114 can cause information system 123 to display a visual warning and/or sound an audible alarm, indicating that vehicular entity 102 is too close to the centerline, the edge of the road, or the other vehicle. In some examples, processor 114 can cause steering system 120 to steer vehicular entity 102 away from the centerline, the edge of the road, or the other vehicle in response to the transmitted information.

Wireless communication devices can include information that is specific to and recognized only by particular vehicles that form a particular subset of all the vehicles passing by wireless communication devices, such as emergency vehicles (e.g., police or fire vehicles ambulances, or the like) or service vehicles. In examples where vehicular entity 102 is such a vehicle, communication component 116 can be configured to recognize that information.

In some examples, a wireless communication device can be used to collect information (e.g., traffic information), such as vehicle speeds, the number of vehicles passing by the communication device, or the like. Communication component 116 can be configured to energize a communication device and write the information to the energized communication device. For example, the current vehicle speed and/or a date and time can be written to the communication device. The communication device can collect such information from each vehicle that passes by the communication device. For example, the information can be used to determine the number of vehicles passing by (e.g., the amount of traffic) on a particular day and time and/or the speeds of the vehicles on a particular date and time.

Each of the respective wireless communication devices can include different route information. However, wireless communication devices can be distributed over a relatively short distance of a road, and the route information might change relatively little from wireless communication device to wireless communication device. As such, if a vehicular entity 102 fails to receive information from a wireless communication device, vehicular entity 102 can receive information from another wireless communication device without a significant loss of information. For example, wireless communication devices that are immediately adjacent to each other, with no intervening wireless communication devices, can include the same information so that no information is lost if vehicular entity 102 fails to receive information from one of the wireless communication devices.

Wireless communication devices can be respectively worn or carried by different pedestrians along a road. For example, in response to being energized by communication component 116, wireless communication devices can respectively send messages to communication component 116 indicating the presence of the respective pedestrians.

Figure 3:
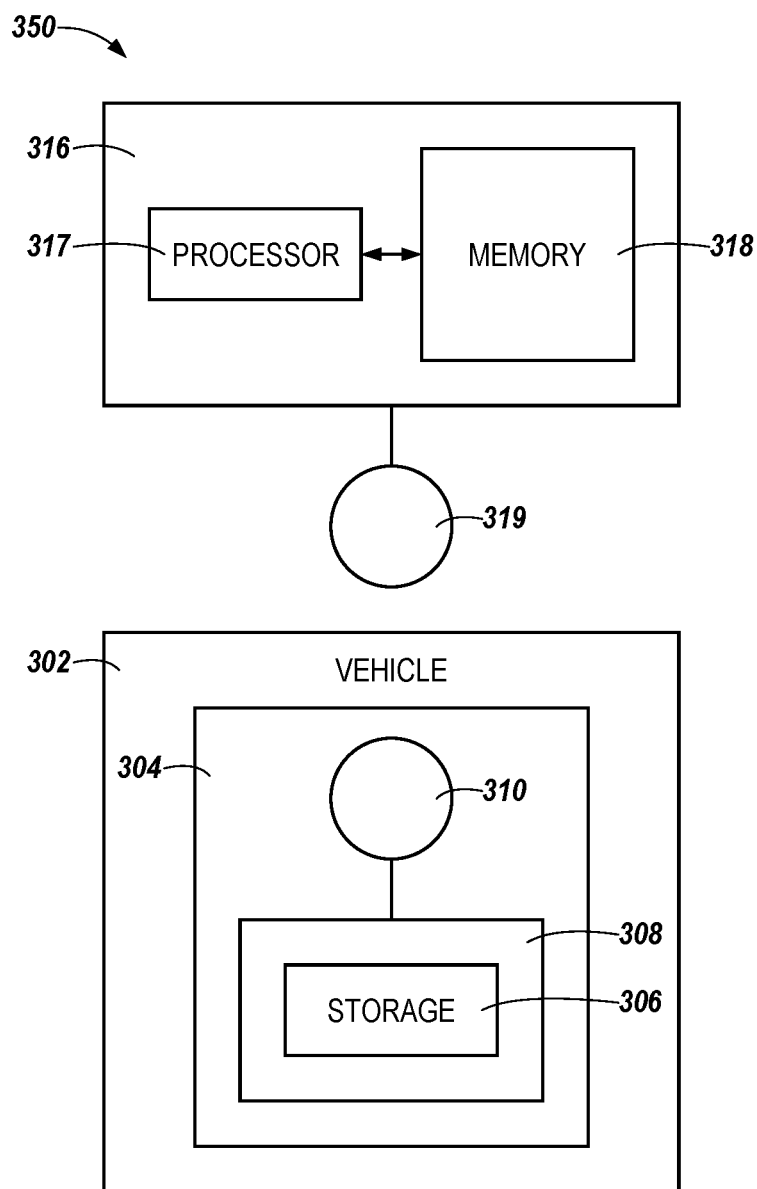
FIG. 3 illustrates an example communications system in accordance with an embodiment of the present disclosure.

FIG. 3 illustrates a communications system 350 in accordance with an embodiment of the present disclosure. System 350 can include a passive wireless communication device, such as a short-range communication device (e.g., an NFC tag 304) that can be as described previously. The NFC tag can be in a vehicular entity 302. Vehicular entity 302 can be configured as shown in FIG. 1 for vehicular entity 102 and include the components of vehicular entity 102 in addition to the NFC tag 304. NFC tag 304 can include a chip 308 having a non-volatile storage component 306 that stores information, such as a user identity information, user financial information for paying a toll, and/or information about vehicular entity 302, such as the speed of vehicular entity 302, the number of passengers in vehicular entity 302, etc. NFC tag 304 can include an antenna 310.

System 350 can include a communications device 316, such an active communications device (e.g., that includes a power supply), that can receive the information from NFC tag 304 and/or can transmit information to vehicular entity 302. In some examples, communications device can include a reader (e.g., an NFC reader), such as a toll reader.

Communications device 316 can include a processor 317 a memory 318, such as a non-volatile memory, and an antenna 319. Memory 318 can include an NFC protocol that allows communications device 316 to communicate with NFC tag 304. For example, communications device 316 and NFC tag 304 can communicate using the NFC protocol, such as at about 13.56 mega-Hertz and according to the ISO/IEC 18000-3 international standard.

Communications device 316 can communicate with an operations center. For example, communications device 316 can be wirelessly coupled or hardwired to the communications center. In some examples, communications device 316 can communicate with the operations center via WIFI or over the Internet. Communications device 316 can energize NFC tag 304 when vehicular entity 302 brings antenna 310 within a communication distance of antenna 319, as described previously. The communication distance can be shorter and can provide better security than previous approaches that use RFID tags.

In some examples, communications device 316 can be a toll reader. For example, NFC tag 304 can transmit user information for paying the toll to communications device 316 in response to being energized by communications device 316. Communications device 316 can then send payment confirmation back to vehicular entity 302, in some instances.

In some examples, communications device 316 can receive real-time information from the operations center and can transmit that information to vehicular entity 302. For example, communications device 316 can transmit road conditions, weather conditions, traffic conditions, etc. to vehicular entity 302. In some examples, a number of communication devices 316 can embedded in a road along a route of vehicular entity 302, located at an entrance to a bridge, located in or on the walls of a tunnel, located in or on a road signs, traffic signals. For example, communication devices 316 can be located anywhere communication devices 104 and/or 204 can be located, as described previously.

Figure 4A:
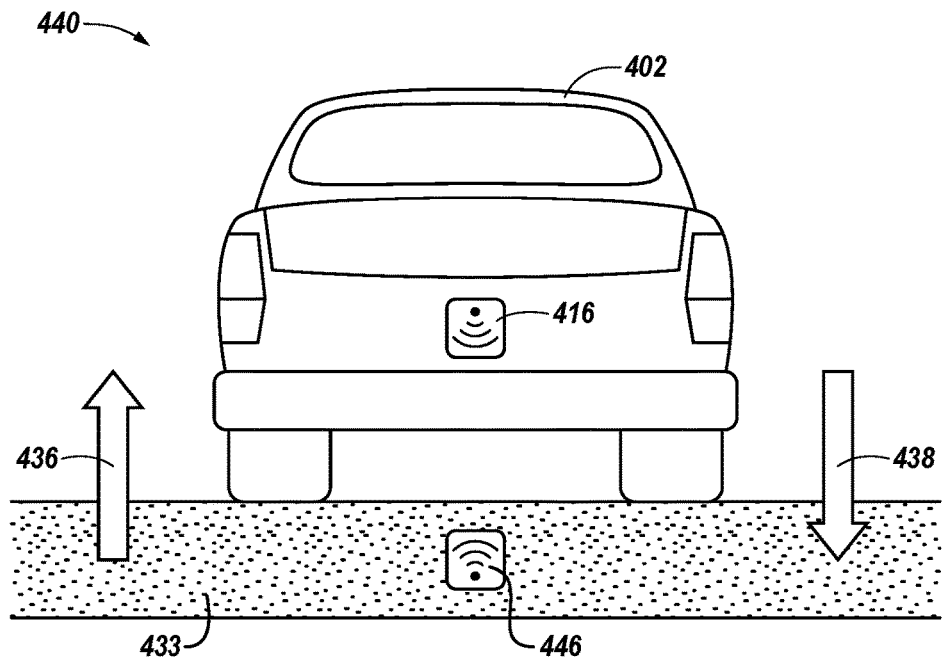
FIGS. 4A-4B each illustrate an example transportation environment, including a transportation assistance entity and vehicular entity, in accordance with an embodiment of the present disclosure.
Figure 4B:
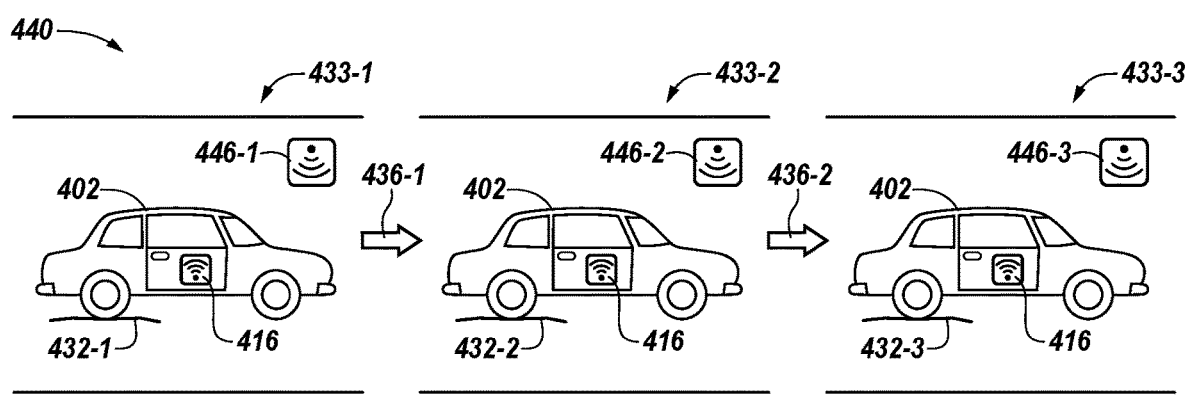

FIGS. 4A-4B each illustrate an example transportation environment 440, including a transportation assistance entity 433 and a vehicular entity 402, in accordance with an embodiment of the present disclosure. As illustrated in FIG. 4A, an external communication component 446 can be embedded within, positioned on, or attached to a transportation assistance entity 433, such as a road lane. As an example, an external communication component 446 can be embedded within a transportation assistance entity 433. As is illustrated, the transportation assistance entity 433 is a road lane. The vehicular entity 402 can include a vehicular communication component 416 that is in communication with the external communication component 446. The vehicular entity 402 can drive in a first direction, indicated by arrow 436, along the transportation assistance entity 433 and in a second direction, indicated by arrow 438, along the transportation assistance entity 433. In this way, the vehicular entity can travel towards, across, and/or away from the external communication component 446. As the vehicular communication component 416 of the vehicular entity 402 approaches within a particular proximity of the external communication component 446, communication can begin and/or become strengthened. The particular proximity, in this example, can refer to a distance of between 50 cm and 100 cm. In an example, the particular proximity can depend on a vehicle antenna system and a position of tags in the road. Although the transportation assistance entity is illustrated as including a road lane, embodiments of the present disclosure are not limited to this example of transportation assistance entities.

FIG. 4B is an illustrated of a vehicular entity 402 within the transportation environment 440 at different points of entry, engagement, and departure in relation to a transportation service being provided. As an example, the vehicular entity 402 can travel over a first location 432-1 of a first road lane portion 433-1. The first road lane portion 433-1 can include a first external communication component 446-1. As the vehicular entity 402 comes in close proximity to the vehicular communication component external communication component 446-1, the vehicular communication component 416 can communicate with the external communication component 446-1. In this example, the close proximity can refer to a distance of greater than 1 meter. In an example, the close proximity can refer to a distance of less than 2 meters. In an example, the close proximity can depend on a maximum distance between road lanes and/or a vehicle antenna system. The communication can indicate that the vehicular entity 402 has entered an entrance for receiving a transportation service. While at the first location 432-1, the vehicular communication component 416 can send a vehicular public key to the external communication component 446-1 and the external communication component 446-1 can send an external public key to the vehicular communication component 416.

These public keys (vehicular and external) can be used to encrypt data sent to each respective communication component and verify an identity of each and exchange invoice, confirmation, and payment information. As an example, as will described further below in association with FIGS. 5-9, the vehicular communication component 416 can encrypt data using the received external public key and send the encrypted data to the external communication component 446-1. Likewise, the external communication component 446-1 can encrypt data using the received vehicular public key and send the encrypted data to the vehicular communication component 416. Data, such as service data sent by the vehicular entity 402 can include credit card information, phone number, email address, identification information, payment information, etc. A driver of the vehicular entity 402 can manually indicate payment and/or automatically confirm payment if this modality is enabled. This confirmation of payment can be sent with a digital signature to verify an identity of the vehicular entity 402. Information about the service can be provided to the vehicular entity 402 and displayed on a dashboard of the vehicular entity 402 or sent to an email associated with the vehicular entity 402. A driver of the vehicular entity 402 can manually confirm details of the service or the service can be previously enabled and automatically accepted at this point in the process.

Further, as the vehicular entity 402 travels, as illustrated by arrow 436-1, to a second location 432-2 of a second road lane portion 433-2, the vehicular communication component 416 can communicate with an external communication component 446-2 of the second road lane portion 433-2. Communication between the vehicular communication component 416 and the external communication component 446-2 can indicate that the vehicular entity 402 is in the location 432-2 to receive the transportation service. As the vehicular entity 402 travels, as illustrated by arrow 436-2, into a third location 432-3 of a third road lane portion 433-3, the proximity of the vehicular communication component 416 to the external communication component 446-3 can indicate that the vehicular entity 402 has received the service and/or has paid for the service. In one example, the exiting vehicle can be recognized based on an identification of the vehicle, a VIN number, etc. along with a vehicular digital signature. Upon receipt and/or payment, data associated with the vehicular entity 402 can be discarded, erased, cleared, etc. from a database associated with the external communication component 446-3.

While this example is described as having an external communication component at each portion of road, examples are not so limited. For example, a single external communication component can communicate with the vehicular entity 402 as it travels through each location and a proximity to the external communication component can indicate which portion of the process the vehicular entity 402 is going through, as described above. Further, in an example, all steps of the process can be performed in a single location, where the vehicular entity 402 enters a location, confirms the service (optionally with payment), and receives the service all at the same location. In addition, payment can occur prior to receiving the service, immediately after receiving the service, or at a later date through a billing process.

In an example, the transportation service received by the vehicular entity 402 can include public services such as travel through a toll gate, parking, and/or a vehicle washing. Each of the public services can be paid for by exchange of an invoice, a confirmation that the vehicular entity 402 wants the service (optionally accompanied by a signature, as described below, to verify the identity of the vehicular entity 402), and payment for the service by the vehicular entity 402. In another example, the transportation services can include services without payment, such as vehicles entering and/or exiting controlled traffic zones, private controlled access (e.g., into truck hubs, taxi stations, etc.), home car garage access, reserved bus stop area (e.g., bus stop area reserved for only for a particular company or business), taxi parking and/or a waiting area for taxis, etc. In the instance where the data sent is accompanied by a signature, a vehicular entity 402 can be prevented from subsequently denying that the vehicular entity 402 requested the transportation service after receiving the service.

In an example, data exchanged between the vehicular entity 402 and the transportation assistance entity 433 can have a freshness used by the other. As an example, data sent by the vehicular entity 402 to the transportation assistance entity 433 to indicate the exact same instructions can be altered at each of a particular time frame or for a particular amount of data being sent. This can prevent a hacker from intercepting previously sent data and sending the same data again to result in the same outcome. If the data has been slightly altered but still indicates a same instruction, the hacker would send the identical information at a later point in time and the same instruction would not be carried out due to the recipient expecting the altered data to carry out the same instruction.

The data exchanged between the vehicular entity 402 and the transportation assistance entity 433 can be performed using a number of encryption and/or decryption methods as described below. The securing of the data can insure that nefarious activity is prevented from interfering with the services procured by the vehicular entity 402 and/or interfering with payment and/or receipt of money for carrying out the services.

Figure 5:
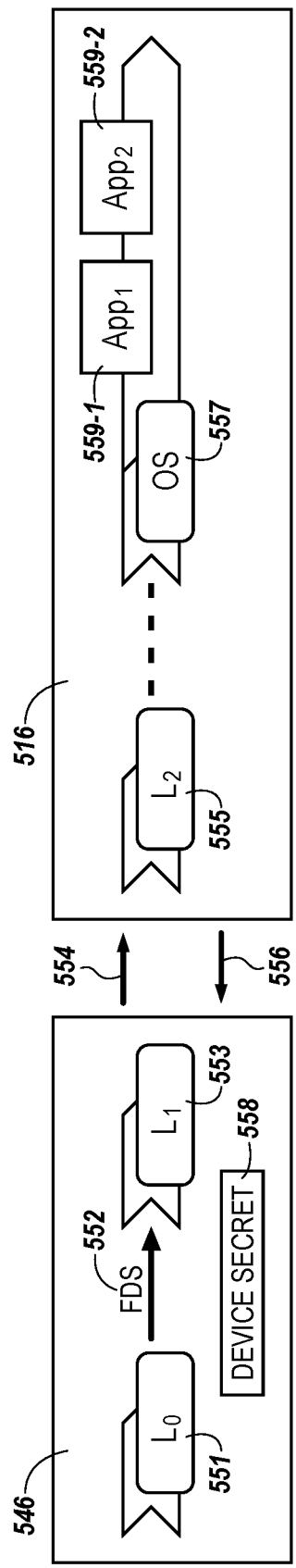
FIG. 5 is a block diagram of an example system including an external communication component and a vehicular communication component in accordance with an embodiment of the present disclosure.

FIG. 5 is a block diagram of an example system including an external communication component 546 and a vehicular communication component 516 in accordance with an embodiment of the present disclosure. As a vehicular entity (e.g., 402 in FIG. 4) comes in close proximity to a road lane (e.g., road lane 433-3), the associated vehicular communication component 516 (e.g., 416-1 in FIG. 4) of the vehicular entity can exchange data with the external communication component 546 of the road lane using a sensor (e.g., a radio frequency identification sensor (RFID)).

A computing device can boot in stages using layers, with each layer authenticating and loading a subsequent layer and providing increasingly sophisticated runtime services at each layer. A layer can be served by a prior layer and serve a subsequent layer, thereby creating an interconnected web of the layers that builds upon lower layers and serves higher order layers. As is illustrated in FIG. 5, Layer 0 ("$L_0$") 551 and Layer 1 ("$L_1$") 553 are within the external communication component. Layer 0 551 can provide a Firmware Derivative Secret (FDS) key 552 to Layer 1 553. The FDS key 552 can describe the identity of code of Layer 1 553 and other security relevant data. In an example, a particular protocol (such as robust internet of things (RIOT) core protocol) can use the FDS 552 to validate code of Layer 1 546 that it loads. In an example, the particular protocol can include a device identification composition engine (DICE) and/or the RIOT core protocol. As an example, an FDS can include Layer 1 firmware image itself, a manifest that cryptographically identifies authorized Layer 1 firmware, a firmware version number of signed firmware in the context of a secure boot implementation, and/or security-critical configuration settings for the device. A device secret 558 can be used to create the FDS 552 and be stored in memory of the external communication component 553.

The external communication component can transmit data, as illustrated by arrow 554, to the vehicular communication component 516. The transmitted data can include an external identification that is public, a certificate (e.g., an external identification certificate), and/or an external public key. Layer 2 ("$L_2$") 555 of the vehicular communication component 516 can receive the transmitted data execute the data in operations of the operating system ("OS") 557 and on a first application 559-1 and a second application 559-2.

In an example operation, the external communication component 546 can read the device secret 558, hash an identity of Layer 1 553, and perform a calculation including:

$$K_{L1} = KDF[Fs(s), \text{Hash}(\text{"immutable information"})]$$

where $K_{L1}$ is an external public key, KDF (e.g., KDF defined in the National Institute of Standards and Technology (NIST) Special Publication 800-108) is a key derivation function (i.e., HMAC-SHA256), and Fs(s) is the device secret 558. FDS 552 can be determined by performing:

$$FDS = HMAC\text{-}SHA256[Fs(s), SHA256(\text{"immutable information"})]$$

Likewise, the vehicular communication component 516 can transmit data, as illustrated by arrow 556, including a vehicular identification that is public, a certificate (e.g., a vehicular identification certificate), and/or a vehicular public key. In the case of using an authenticated mode, the vehicular communication component 516 can send a vehicle identification number (VIN) for further authentication, identification, and/or verification of the vehicular entity.

In at least one example, the vehicular entity can log onto the system of the road lane (e.g., log into the external communication component 446-3) using either of an anonymous log in or an authenticated log in. The authentication log in can allow the vehicular entity to obtain additional information that may not be accessible when logging in anonymously in an anonymous mode. In at least one example, the authentication can include providing a vehicular identification number (VIN) and/or authentication information, such as an exchange of public keys, as will be described below. In either of the anonymous and authenticated modes, the road lane can communicate with the vehicular entity to provide the external public key associated with the road lane to the vehicular entity.

Figure 6:
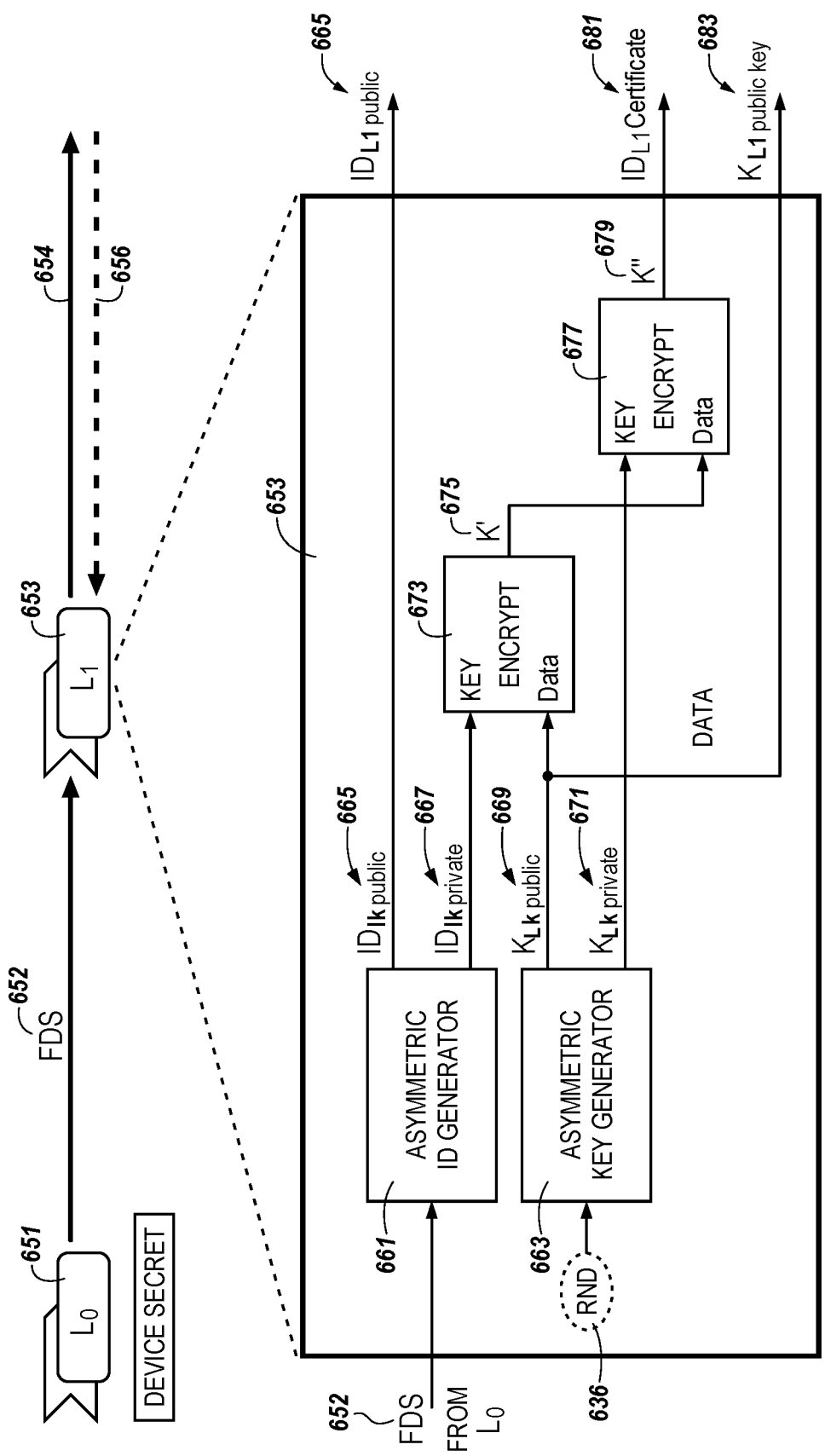
FIG. 6 is a block diagram of an example process to determine a number of parameters in accordance with an embodiment of the present disclosure.

FIG. 6 is a block diagram of an example process to determine a number of parameters in accordance with an embodiment of the present disclosure. FIG. 6 is an example of a determination of the parameters including the external public identification, the external certificate, and the external public key that are then sent, indicated by arrow 654, to Layer 2 (e.g., Layer 2 555) of a vehicular communication component (e.g., 516 in FIG. 5). Layer 0 ("$L_0$") 651 in FIG. 6 corresponds to Layer 0 551 in FIG. 5 and likewise FDS 652 corresponds to FDS 552, Layer 1 653 corresponds to Layer 1 553, and arrows 654 and 656 correspond to arrows 554 and 556, respectively.

The FDS 652 from Layer 0 651 is sent to Layer 1 653 and used by an asymmetric ID generator 661 to generate a public identification ("$ID_{lk\ public}$") 665 and a private identification 667. In the abbreviated "$ID_{lk\ public}$," the "lk" indicates Layer k (in this example Layer 1), and the "public" indicates that the identification is openly shared. The public identification 665 is illustrated as shared by the arrow extending to the right and outside of Layer 1 653 of the external communication component. The generated private identification 667 is used as a key input into an encryptor 673. The encryptor 673 can be any processor, computing device, etc. used to encrypt data.

Layer 1 653 of an external communication component can include an asymmetric key generator 663. In at least one example, a random number generator (RND) 636 can optionally input a random number into the asymmetric key generator 663. The asymmetric key generator 663 can generate a public key ("$K_{Lk\ public}$") 669 (referred to as an external public key) and a private key ("$K_{LK\ private}$") 671 (referred to as an external private key) associated with an external communication component such as external communication component 546 in FIG. 5. The external public key 669 can be an input (as "data") into the encryptor 673. The encryptor 673 can generate a result K'675 using the inputs of the external private identification 667 and the external public key 669. The external private key 671 and the result K'675 can be input into an additional encryptor 677, resulting in output K" 679. The output K" 679 is the external certificate ("IDLi certificate") 681 transmitted to the Layer 2 (555 of FIG. 5). The external certificate 681 can provide an ability to verify and/or authenticate an origin of data sent from a device. As an example, data sent from the external communication component can be associated with an identity of the external communication component by verifying the certificate, as will be described further in association with FIG. 8. Further, the external public key ("$K_{L1\ public\ key}$") 683 can be transmitted to Layer 2. Therefore, the public identification 665, the certificate 681, and the external public key 683 of an external communication component 633 can be transmitted to Layer 2 of a vehicular communication component.

Figure 7:
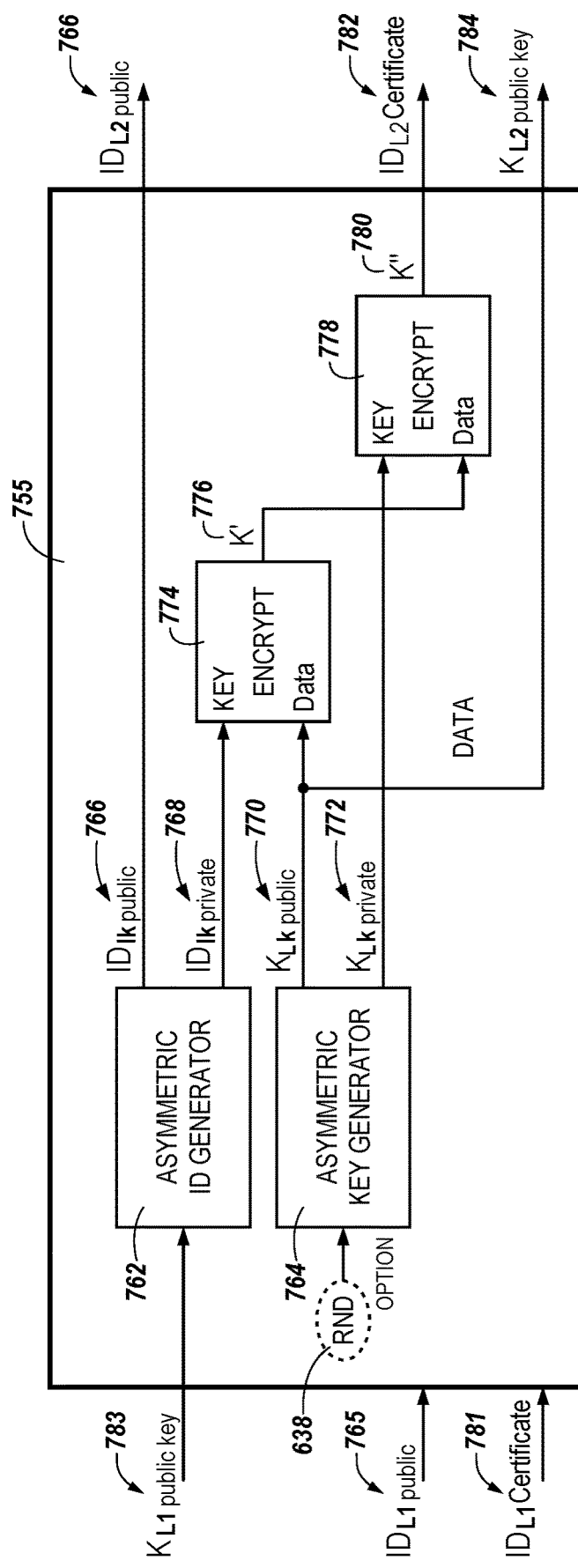
FIG. 7 is a block diagram of an example process to determine a number of parameters in accordance with an embodiment of the present disclosure.

FIG. 7 is a block diagram of an example process to determine a number of parameters in accordance with an embodiment of the present disclosure. FIG. 7 illustrates a Layer 2 755 of a vehicular communication component (e.g., vehicular communication component 516 in FIG. 5) generating a vehicular identification ("$ID_{L2}$ public") 766, a vehicular certificate ("$ID_{L2}$ Certificate") 782, and a vehicular public key ("$K_{L2\ public\ key}$") 784.

The external public key ("KU public key") 683 transmitted from Layer 1 of the external communication component to Layer 2 755 of a vehicular communication component, as described in FIG. 6, is used by an asymmetric ID generator 762 of the vehicular communication component to generate a public identification ("$ID_{lk\ public}$") 766 and a private identification 768 of the vehicular communication component. In the abbreviated "$ID_{lk\ public}$," the "lk" indicates Layer k (in this example Layer 2), and the "public" indicates that the identification is openly shared. The public identification 766 is illustrated as shared by the arrow extending to the right and outside Layer 2 755. The generated private identification 768 is used as a key input into an encryptor 774.

Layer 2 755 of the vehicular communication component can include an asymmetric key generator 764. In at least one example, a random number generator (RND) 638 can optionally input a random number into the asymmetric key generator 764. The asymmetric key generator 764 can generate a public key ("$K_{Lk\ public}$") 770 (referred to as a vehicular public key) and a private key ("$K_{LK\ private}$") 772 (referred to as a vehicular private key) associated with a vehicular communication component such as vehicular communication component 516 in FIG. 5. The vehicular public key 770 can be an input (as "data") into the encryptor 774. The encryptor 774 can generate a result K' 776 using the inputs of the vehicular private identification 768 and the vehicular public key 770. The vehicular private key 772 and the result K' 776 can be input into an additional encryptor 778, resulting in output K" 780. The output K" 780 is the vehicular certificate ("$ID_{L2}$ certificate") 782 transmitted back to the Layer 1 (553 of FIG. 5). The vehicular certificate 782 can provide an ability to verify and/or authenticate an origin of data sent from a device. As an example, data sent from the vehicular communication component can be associated with an identity of the vehicular communication component by verifying the certificate, as will be described further in association with FIG. 8. Further, the vehicular public key ("$K_{L2\ public\ key}$") 784 can be transmitted to Layer 1. Therefore, the public identification 766, the certificate 782, and the vehicular public key 784 of the vehicular communication component can be transmitted to Layer 1 of an external communication component.

In an example, in response to an external communication component receiving a public key from a vehicular communication component, the external communication component can encrypt data to be sent to the vehicular communication component using the vehicular public key. Vice versa, the vehicular communication component can encrypt data to be sent to the external communication component using the external public key. In response to the vehicular communication component receiving data encrypted using the vehicular public key, the vehicular communication component can decrypt the data using its own vehicular private key. Likewise, in response to the external communication component receiving data encrypted using the external public key, the external communication component can decrypt the data using its own external private key. As the vehicular private key is not shared with another device outside the vehicular communication component and the external private key is not shared with another device outside the external communication component, the data sent to the vehicular communication component and the external communication component remains secure.

Figure 8:
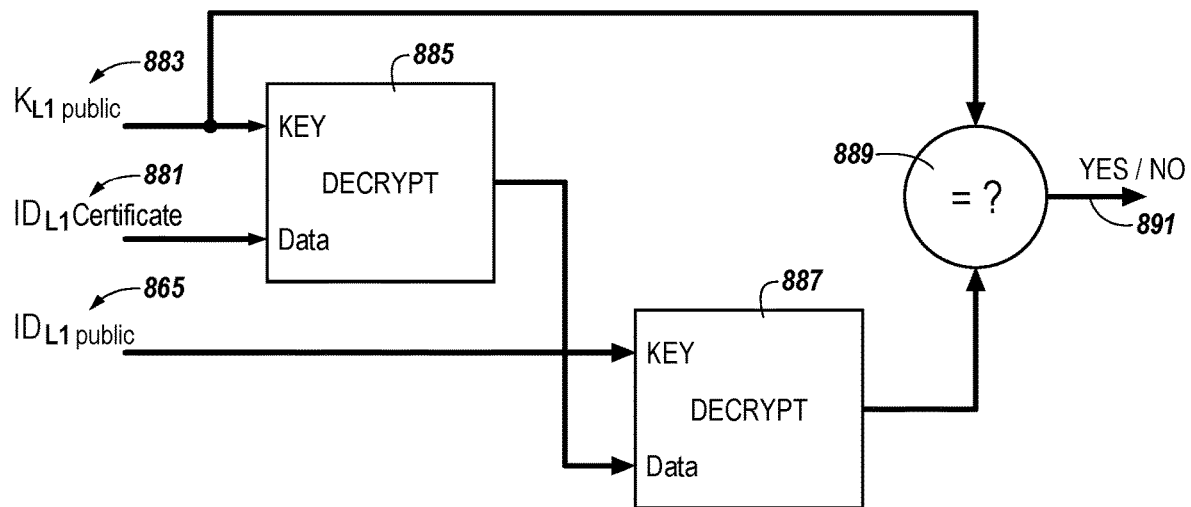
FIG. 8 is a block diagram of an example process to verify a certificate in accordance with an embodiment of the present disclosure.

FIG. 8 is a block diagram of an example process to verify a certificate in accordance with an embodiment of the present disclosure. In the illustrated example of FIG. 8, a public key 883, a certificate 881, and a public identification is provided from an external communication component (e.g., from Layer 1 553 of external communication component 546 in FIG. 5). The data of the certificate 881 and the external public key 883 can be used as inputs into a decryptor 885. The decryptor 885 can be any processor, computing device, etc used to decrypt data. The result of the decryption of the certificate 881 and the external public key 883 can be used as an input into a secondary decryptor 887 along with the public identification, result in an output. The external public key 883 and the output from the decryptor 887 can indicate, as illustrated at 889, whether the certificate is verified, resulting in a yes or no 891 as an output. In response to the certificate being verified, data received from the device being verified can be accepted, decrypted, and processed. In response to the certificate not being verified, data received from the device being verified can be discarded, removed, and/or ignored. In this way, nefarious devices sending nefarious data can be detected and avoided. As an example, a hacker sending data to be processed can be identified and the hacking data not processed.

Figure 9:
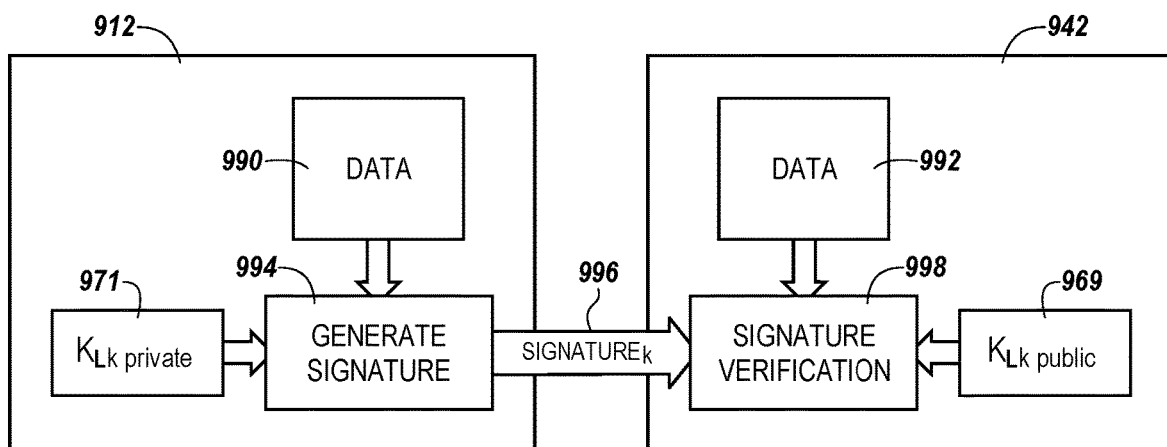
FIG. 9 is a block diagram of an example process to verify a signature in accordance with an embodiment of the present disclosure.

FIG. 9 is a block diagram of an example process to verify a signature in accordance with an embodiment of the present disclosure. In the instance where a device is sending data that may be verified in order to avoid subsequent repudiation, a signature can be generated and sent with data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

A vehicle computing device 912 (such as vehicle computing device 112 in FIG. 1) can send data 990 to an external computing device (such as external computing device 242). The vehicle computing device 912 can generate, at 994, a signature 996 using a vehicular private key 971. The signature 996 can be transmitted to the external computing device 942. The external computing device 942 can verify, at 998, using data 992 and the external public key 969 previously received. In this way, signature verification operates by using a private key to encrypt the signature and a public key to decrypt the signature. In this way, a unique signature for each device can remain private to the device sending the signature while allowing the receiving device to be able to decrypt the signature for verification. This is in contrast to encryption/decryption of the data, which is encrypted by the sending device using the public key of the receiving device and decrypted by the receiving device using the private key of the receiver. In at least one example, the vehicle can verify the digital signature by using an internal cryptography process (e.g., Elliptical Curve Digital signature (ECDSA) or a similar process.

In the preceding detailed description, reference is made to the accompanying drawings that form a part hereof, and in which is shown, by way of illustration, specific examples. In the drawings, like numerals describe substantially similar components throughout the several views. Other examples may be utilized, and structural, logical and/or electrical changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense.

As used herein, "a," "an," or "a number of" something can refer to one or more of such things. A "plurality" of something intends two or more. As used herein, the term "coupled" may include electrically coupled, directly coupled, and/or directly connected with no intervening elements (e.g., by direct physical contact) or indirectly coupled and/or connected with intervening elements. The term coupled may further include two or more elements that co-operate or interact with each other (e.g., as in a cause and effect relationship).

Although specific examples have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. The scope of one or more examples of the present disclosure should be determined with reference to the appended claims, along with the full range of equivalents to which such claims are entitled.

What is claimed is:

1. An apparatus, comprising:
   a processor; and
   an external communication component coupled to the processor, wherein the external communication component is configured to, in response to determining a vehicular entity is within a particular proximity to the external communication component:
   generate an external private key and an external public key;
   provide the external public key and data to a vehicular communication component associated with the vehicular entity;
   receive data from the vehicular communication component in response to providing the external public key and data to the vehicular communication component, wherein the received data comprises a vehicular digital signature;
   determine an identity of the vehicular entity based on the vehicular digital signature, wherein the determined identity prevents subsequent repudiation of a provided service;
   decrypt the received data using the external private key; and
   provide the service to the vehicular entity based on the decrypted received data.

2. The apparatus of claim 1, wherein the external communication component is configured to, in response to providing the service to the vehicular entity, receive confirmation data from the vehicular communication component encrypted using the external public key.

3. The apparatus of claim 2, wherein the external communication component is configured to decrypt the confirmation data using the external private key.

4. The apparatus of claim 1, wherein the external communication component is configured to, in response to providing the service to the vehicular entity, receive payment data from the vehicular communication component.

5. The apparatus of claim 4, wherein the external communication component is further configured to, in response to receiving the payment data, removing data associated with the vehicular entity from storage of the external communication component.

6. The apparatus of claim 1, wherein the service comprises at least one of a vehicle wash, passage through a toll gate, and parking.

7. The apparatus of claim 1, wherein the data provided by the external communication component to the vehicular communication component comprises service data and cost data.

8. The apparatus of claim 1, wherein the data received from the vehicular communication component comprises vehicle identification data, service confirmation data, and personal identification data.

9. The apparatus of claim 1, wherein the service comprises entry into an area or facility.

10. The apparatus of claim 1, wherein the external communication component is configured to:
    receive a vehicular public key from the vehicular communication component; and
    prior to providing the data to the vehicular communication component, encrypt the data using the vehicular public key.

11. The apparatus of claim 1, wherein the external communication component is configured to provide the vehicular public key to the vehicular communication component using radio-frequency identification (RFID).

12. A method comprising:
    generating an external private key and an external public key;
    providing the external public key to a vehicular communication component associated with a vehicular entity;
    receiving a vehicular public key from the vehicular communication component;
    encrypting data using the vehicular public key;

providing the encrypted data to the vehicular communication component,
wherein:
subsequent data provided to the vehicular communication component that instructs the vehicular communication component to execute a same instruction is altered based on a particular parameter; and
the altered subsequent data still instructs the vehicular communication component to execute the same instruction;
receiving data from the vehicular communication component in response to providing the encrypted data to the vehicular communication component;
decrypting the received data using the external private key; and
providing a service to the vehicular entity based on the decrypted received data.

13. The method of claim 12, comprising determining that the vehicular entity is a particular distance from an external communication component prior to providing or receiving information to or from the vehicular communication component.

14. The method of claim 12, comprising:
receiving a digital signature from the vehicular communication component;
verifying the digital signature using the vehicular public key; and
providing the service in response to verifying the digital signature.

15. The method of claim 12, wherein the particular parameter comprises at least one of a period of time and a frequency of the same instruction being sent.

16. The method of claim 12, wherein the encrypting and decrypting are performed using a device identification composition engine (DICE)-robust internet of thing (RIOT) protocol.

17. An apparatus, comprising:
a processor; and
a vehicular communication component coupled to the processor, wherein the vehicular communication component is configured to, in response to determining the vehicular communication component is within a particular proximity to an external communication component:
generate a vehicular private key and a vehicular public key;
provide the vehicular public key to the external communication component, wherein the external communication component is associated with a service;
receive an external public key from the external communication component;
encrypt data using the external public key, wherein the encrypted data comprises a vehicular digital signature that indicates an identity of the vehicular communication component and prevents repudiation of the service;
provide the encrypted data to the external communication component; and
receive data from the external communication component in response to providing the encrypted data to the external communication component;
decrypt the received data using the vehicular private key; and
provide confirmation of acceptance of the service in response to the decrypted data indicating the service.

18. The apparatus of claim 17, wherein the vehicular communication component is configured to generate an external certificate by:
encrypting a vehicular identification and a private vehicular identification resulting in an encrypted value; and
encrypting the encrypted value and the vehicular private key.

19. The apparatus of claim 18, wherein the vehicular identification and the private vehicular identification are generated using an asymmetric identification generator.

20. The apparatus of claim 18, wherein the external certificate indicates an identification of the vehicular entity associated with the vehicular communication component.

21. The apparatus of claim 17, wherein the vehicular public key and the vehicular private key are generated using an asymmetric key generator.

22. A system, comprising:
a vehicular apparatus of a vehicular entity, comprising:
a vehicular processor; and
a vehicular communication component coupled to the vehicular processor and configured to generate a vehicular private key and a vehicular public key; and
an external apparatus coupled to a transportation assistance entity, the external apparatus comprising:
an external processor; and
an external communication component coupled to the external processor and configured to:
generate an external private key and an external public key;
receive the vehicular public key; and
encrypt external data using the vehicular public key; and
determine an identity of the vehicular entity based on the vehicular digital signature;
wherein the determined identity of the vehicular entity prevents subsequent repudiation of the provided service; and
wherein the external data indicates a service to be provided to the vehicular entity;
wherein the vehicular communication component is further configured to:
receive the external public key and external data;
decrypt the external data using the vehicular private key; and
encrypt vehicular data using the external public key, wherein the encrypted vehicular data comprises the vehicular digital signature and indicates confirmation of the provided service;
and
wherein the external communication component is further configured to:
receive the encrypted vehicular data; and
decrypt the vehicular data using the external private key; and
provide the service to the vehicular entity.

* * * * *